United States Patent [19]
Junk

[11] 3,853,292
[45] Dec. 10, 1974

[54] MOUNTING BRACKET

[75] Inventor: Heinrich J. Junk, Maplewood, Mo.

[73] Assignee: Chamois Electronic Manufacturing Company, Inc., Chamois, Mich.

[22] Filed: Feb. 1, 1973

[21] Appl. No.: 328,873

[52] U.S. Cl. .................................. 248/203, 312/245
[51] Int. Cl. ..... A47b 77/08, A47b 67/00, A47f 5/08
[58] Field of Search ........... 248/309, 223, 224, 225, 248/203; 312/245; 181/31 B; 70/58; 292/163, 121, 337, DIG. 60; 211/87

[56] References Cited
UNITED STATES PATENTS

| | | | |
|---|---|---|---|
| 3,193,341 | 7/1965 | Preston | 312/245 |
| 3,211,408 | 10/1965 | Schaefer | 248/203 |
| 3,237,505 | 3/1966 | Peterson | 248/14 X |
| 3,731,760 | 5/1973 | Hammes | 181/31 B |

FOREIGN PATENTS OR APPLICATIONS
255,070  6/1967  Austria .............................. 248/225

*Primary Examiner*—J. Franklin Foss
*Attorney, Agent, or Firm*—Rogers, Ezell & Eilers

[57] ABSTRACT

A bracket for securely mounting to a wall or the like a device having opposed inner surfaces, such as a loudspeaker, the bracket comprising an elongated support member adapted to be mounted to a wall and including opposed, outwardly extending arms positioned to fit within the opposed inner surfaces of the device, the arms including opposed, outwardly extending projections adapted to engage orifices in the opposed inner device surfaces. At least one arm of the bracket is provided with bias means urging the projection thereof in an outwardly direction so as to cause it to enter and be retained in the orifice in the device.

15 Claims, 9 Drawing Figures

PATENTED DEC 10 1974 3,853,292
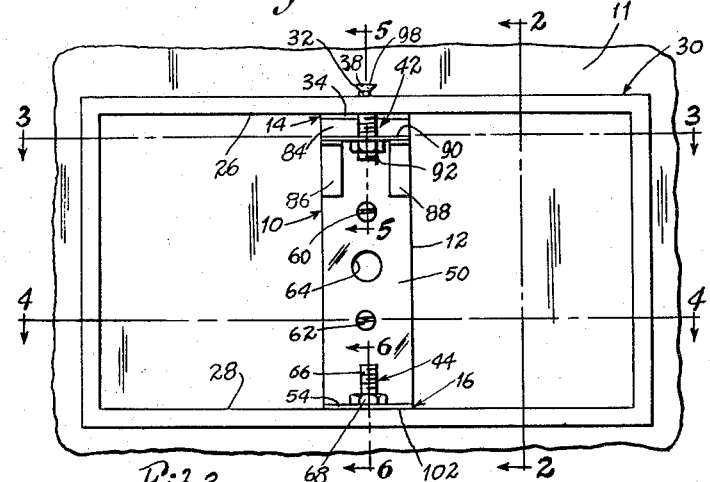
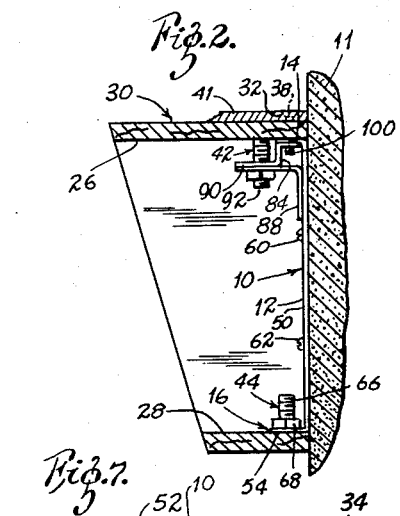
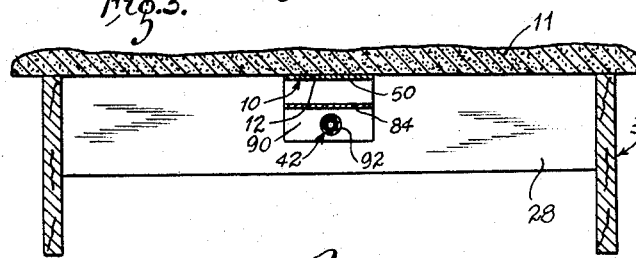
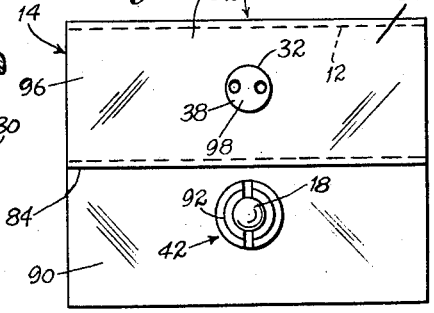
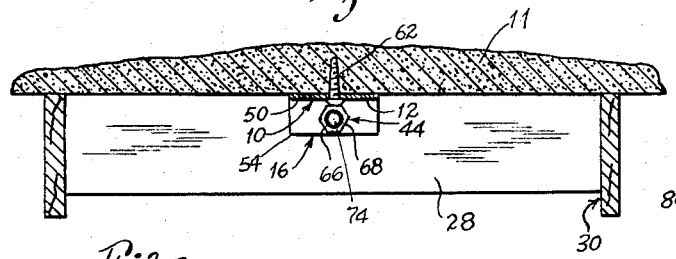
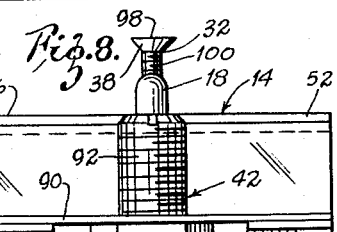
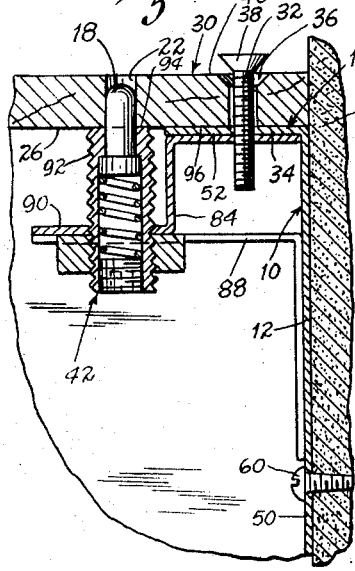
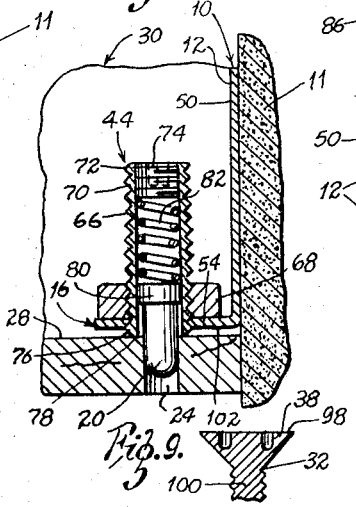
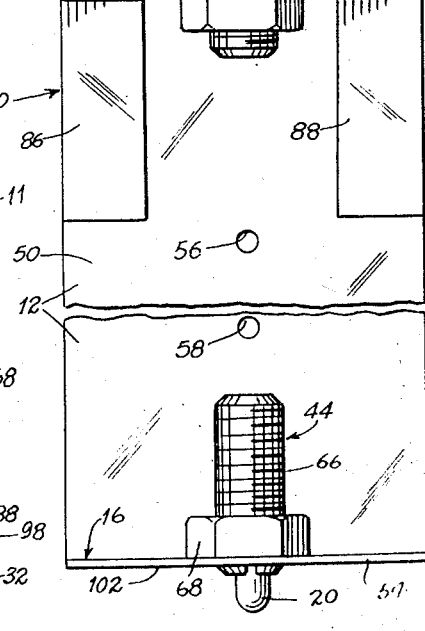

MOUNTING BRACKET

The present invention relates to supporting structures, and more particularly to a mounting bracket for securely mounting a loudspeaker or like device to a supporting surface such as a wall.

Loudspeakers, warning bells and like devices often must be mounted to the walls of a schoolroom or other building. The mounting devices which are used necessarily must permit the device which is mounted to the wall to be removed for repair or replacement, and yet must retain the device so as to prevent the same from falling. It is often the case, unfortunately, that loudspeakers and other similar devices are the subject of pilferage. Many mounting brackets presently used for mounting a device such as a loud speaker to a wall are easily defeated by a thief. In some instances, for example, loudspeakers and the like are merely hung upon a hook-like bracket mounted to a wall. In other cases, the loudspeaker or similar device may be directly mounted to the wall by screws or the like such that the loudspeaker cannot be easily removed for servicing or replacement. Still other mounting brackets, to defeat would-be thieves, are quite complicated in nature and require such accessories as key-locks, etc. (e.g., see U.S. Pat. No. 3,370,446).

A mounting bracket which would permit a loudspeaker or the like to be readily installed or removed from attachment to a wall or the like, which would be theft-resistant, and which would be inexpensive to manufacture and sell, is greatly to be desired.

It is hence an object of the present invention to provide a bracket to facilitate the mounting to a wall or the like of a loudspeaker or similar device in a theft-resistant but readily removable manner.

It is another object of the invention to provide a theft-resistant bracket for mounting to a wall or the like a loudspeaker or like device wherein demounting of the loudspeaker from the bracket may be easily and readily accomplished with the use of a special tool or tools.

It is yet another object of the invention to provide a theft-resistant, easily-operated, inexpensive bracket for mounting a loudspeaker or like device to a wall or the like.

Briefly, the present invention relates to a bracket for securely mounting to a wall or the like a device having opposed inner surfaces such as a loudspeaker cabinet. The bracket comprises an elongated support member adapted to be mounted to a wall or the like, the support member having opposed, outwardly extending arms positioned to fit within the opposed inner surfaces of the device. The arms of the bracket include opposed, outwardly extending projections adapted to engage orifices in the opposed inner surfaces of the device, at least one of the arms including bias means urging the projection of said arm outwardly. In the drawing:

FIG. 1 is a front view of the bracket of the present invention having mounted thereto a loudspeaker cabinet with the front portion of the cabinet removed to show the bracket;

FIG. 2 is a cross sectional view taken along line 2—2 of FIG. 1 showing the optional aperture cover plate;

FIG. 3 is a view in cross section taken along line 3—3 of FIG. 1;

FIG. 4 is a view in cross section taken along line 4—4 of FIG. 1;

FIG. 5 is a broken away view, in cross section, taken along line 5—5 of FIG. 1;

FIG. 6 is a broken away view, in cross section, taken along line 6—6 of FIG. 1;

FIG. 7 is a plan view of the bracket of the present invention;

FIG. 8 is a front view of the bracket of the present invention, shown partly broken away; and FIG. 9 is a front view, shown in cross section and partly broken away, of a locking bolt of a bracket of the invention, the top view of which is illustrated in FIG. 7.

Referring now to FIGS. 1 and 2, the bracket of the present invention is shown generally as 10, and comprises an elongated support member 12 adapted to be mounted to a wall 11 or the like and having opposed, outwardly extending arms designated generally as 14 and 16, respectively. The arms 14 and 16 include opposed, outwardly-extending projections 18 and 20 (FIGS. 5–8) adapted respectively to engage orifices 22 and 24 in the opposed inner surfaces 26 and 28 of the sides of the loudspeaker cabinet 30, thus retaining the cabinet on the bracket. Locking bolt 32 is threaded into an upper portion 34 of arm 14 (FIG. 5) and extends through aperature 36 in a wall of the loudspeaker. The enlarged head 38 of the bolt preferably lockingly abuts the outer surface 40 of the wall of the loudspeaker cabinet, or lockingly abuts an aperture cover plate 41 which extends over aperture 36 (shown in FIG. 2). As will be explained more fully below, outwardly extending arm 14, and preferably also arm 16, includes bias means such as the spring assemblies denoted generally as 42 and 44 to urge the projections 18 and 20 outwardly and seat the same securely within orifices 22 and 24.

In a preferred embodiment, the frame portion of the bracket is formed from steel sheeting which may be about 2-½ inches wide and about three sixty-fourths inches in thickness. A generally C-shaped length of the so-described steel sheeting 50 of the width and thickness described and having an elongated supporting central portion 12 about 8-¼ inches in length and inwardly turned, substantially parallel end portions 52 and 54, each of about 1 inch in length, is provided with holes 56 and 58 for mounting of the bracket to a wall or the like with screws 60 and 62 and is also provided with a central orifice (shown as 64 in FIG. 1) through which wires leading from the loudspeaker may pass for insertion into a conduit or the like located in the wall. The bottom portion 54 has an orifice therein threaded to receive the threaded outer surface 66 of spring assembly 44, the spring assembly being held tightly in place by locking nut 68 (FIGS. 6 and 8). The spring assembly 44 includes a hollow, cylindrical supporting structure 70 having a threaded outer surface 66, and an inner surface threaded at its upper end 72 to receive set screw 74 and having at the other end 76 thereof an inwardly extending shelf portion 78. Bullet projection 20, having an upper portion 80 of increased diameter, is carried slidingly in supporting structure 70 and is urged in a downwardly direction by spring 82, the downward travel of projection 20 being limited by abutment of its upper portion 80 against shelf portion 78 of the supporting structure. Bullet shaped projection 20 may be about one-fourth inch in diameter and may extend approximately one-fourth inch below the lower surface of supporting structure 70.

Attached to the upper end portion 52 of C-shaped steel plate 50 by welding or the like is an off-set supporting plate 84, which in turn is additionally supported by supporting members 86 and 88, as shown best in FIGS. 5 and 8. As shown best in FIG. 5, the off-set supporting plate 84, supported by strips 86 and 88, provides a depressed shelf 90 which is substantially parallel to end portions 52 and 54 of steel sheet 50. Shelf 90 has a threaded orifice therein to receive the threaded outer surface of supporting structure 92 of spring assembly 42. Spring assembly 42 is substantially identical to spring assembly 44 described in detail above, and is vertically positioned so that the upper surface 94 of supporting structure 92 is substantially co-planar with the plane defining the upper surface 96 of end portion 52.

Upper end portion 52 of steel plate 50 and the attached portion of off-set plate 84 are provided with a threaded orifice therein to receive threaded locking bolt 32, this bolt being adapted to extend upwardly through an aperture 36 in the side of the loudspeaker cabinet adjacent orifice 22 therein in a direction substantially parallel to projection 18. The upper periphery of aperture 36 may be counter-sunk slightly to snugly accommodate the head portion 38 of locking bolt 32, as shown in FIG. 5. If desired, a separate plate member 41, shown in section in FIG. 2, may be carried by locking bolt 32 such that when the bolt is screwed down tightly, the plate member will cover orifice 22, thereby preventing access to the orifice from outside of the loudspeaker cabinet. As shown in FIGS. 7 and 9, the upper surface 98 of the locking bolt may be provided with a pair of small, shallow, suitably spaced depressions (as shown) or with suitable grooves, notches, etc., to accommodate the tip of a correspondingly designed screwdriver. The resulting screw, seated snugly within counter-sunk orifice 36, is thus tamper-resistant; without the use of a correspondingly designed special screwdriver, the screw can be removed only with great difficulty. The body 100 of the screw is preferably of sufficient bulk to resist breakage should a would-be thief attempt to physically wrench an attached loudspeaker or similar device from the bracket.

As thus described and depicted, the outwardly extending arms 14 and 16 of the bracket of the invention include substantially parallel outer surfaces 96 and 102 (FIGS. 5,6 and 8). In one preferred embodiment, the arm portions bearing surfaces 96 and 102 extend outwardly for sufficient distance to require the inner surfaces 26 and 28 of a loudspeaker cabinet to be maintained substantially parallel therewith when a loudspeaker cabinet or the like is mounted to or removed from the bracket. As such (disregarding the action of locking bolt 32), the depression of either of bullet projections 18 or 20 from outside the loudspeaker cabinet through orifices 22 or 24 will not permit the cabinet to be removed from the bracket, since any tilting upwardly or downwardly of the cabinet with respect to the bracket will cause the bracket to become wedged or jammed in the cabinet. In another embodiment, either or both of substantially parallel outer surfaces 96 and 102 extend outwardly from the elongated central member 12 for only a short distance, thereby permitting a loudspeaker cabinet (again disregarding the locking bolt 32) to be removed by depressing one of the bullet projections, disengaging the cabinet from the arm bearing the projection so depressed, and then moving the cabinet away from the opposed projection.

As will be evident from the above description, outwardly extending projections 18 and 20 are adapted to be depressed from outside of the cabinet or like device by forcing a slim rod or other tool into the respective orifices 22 and 24. It will further be understood that, in the preferred embodiment wherein substantial parallelism must be maintained between the inner surfaces of the loudspeaker and the outer surfaces of the bracket arms during mounting or removal, it will be desirable to simultaneously depress the bullet-like projections 18 and 20 in order to remove the loudspeaker cabinet from the bracket. In this regard, it will be understood that a plier-shaped device may be used wherein the jaws of the plier are widely separated and are provided with suitably dimensioned projections adapted for insertion into orifices 22 and 24 to simultaneously depress projections 18 and 20. Thus, removal of a loudspeaker cabinet from the bracket requires firstly that locking bolt 32 be removed by means of a specially designed screwdriver, and that the projections 18 and 20 then be simultaneously depressed, as by the above described plier.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

I claim:

1. A bracket for securely mounting to a wall or the like a device having sides with opposed inner surfaces, said bracket comprising an elongated support member adapted to be mounted to said wall or the like and having opposed, outwardly extending arms positioned to fit within said opposed inner surfaces of said device, said arms including opposed outwardly-extending projections adapted to engage orifices in said opposed inner surfaces of the device, at least one such arm including bias means urging the projection thereof outwardly, at least one of the projections being adjustable substantially into the plane of the cooperating inner surface and in a close supporting relationship thereto.

2. The bracket according to claim 1 including locking means for locking the device to the bracket comprising a tamper-resistant locking bolt attachable to an arm of said bracket and adapted to extend through an aperture in said device.

3. The bracket according to claim 2 wherein said locking bolt is attachable to an end portion of said bracket adjacent the outwardly extending projection thereof and is adapted to extend outwardly therefrom in a direction substantially parallel to said projection so as to pass through said aperture in said device adjacent the orifice thereof receiving said projection and lockingly abut the outer surface of said device.

4. The bracket according to claim 3 including cover means for covering the projection-receiving orifice adjacent said aperture receiving said locking bolt, said cover means being held in place by said locking bolt.

5. The bracket of claim 1 wherein at least one of the outwardly extending end portions has an off-set supporting plate and having at least one of the projections mounted on the off-set supporting plate.

6. The bracket of claim 5 wherein the off-set supporting plate is reinforced by additional supporting members.

7. The bracket of claim 5 wherein the projection on the off-set supporting plate is adjustable substantially into the plane of the cooperating arm and in a close supporting relationship therewith.

8. The bracket according to claim 5 including a tamper-resistant locking bolt attachable to one of said arms and positioned to extend outwardly therefrom through an aperture in said device and lockingly abut an outer surface of said device.

9. The bracket according to claim 8 additionally including cover means for covering the orifice receiving the projection of said one arm, said cover means being held in position by said locking bolt.

10. The bracket of claim 1 wherein the opposed outwardly extending arms have substantially parallel outer surfaces.

11. The bracket of claim 10 wherein at least one of the outwardly-extending arms has an off-set supporting plate which is reinforced by additional supporting members attached to the bracket, at least one of the projections being adjustably mounted on the off-set supporting plate.

12. The bracket of claim 11 wherein the projection is adjustable substantially into the plane of the cooperating arm.

13. The bracket of claim 10 including a tamper-resistant locking bolt attachable to an arm of said bracket and adapted to extend outwardly therefrom in a direction substantially parallel to the projection thereof so as to pass through an aperture in said device and lockingly abut an outer surface of the device.

14. The bracket of claim 1 wherein said substantially parallel outer surfaces of said arms are of sufficient area and fit sufficiently snugly to require the alignment of said device with said bracket to be substantially maintained during demounting of said device.

15. The bracket of claim 1 wherein the biasing means causes the projections to seat in the orifices when the device is mounted on the bracket.

* * * * *